July 31, 1962  F. R. L. ZENTGRAF  3,047,706
ELECTRIC HEATER ASSEMBLIES
Filed May 19, 1959  3 Sheets-Sheet 3
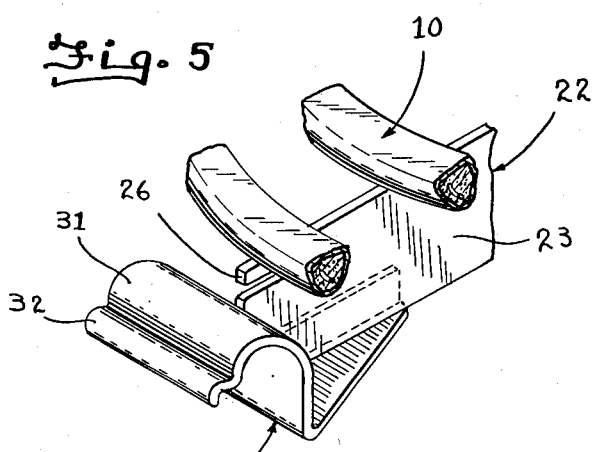
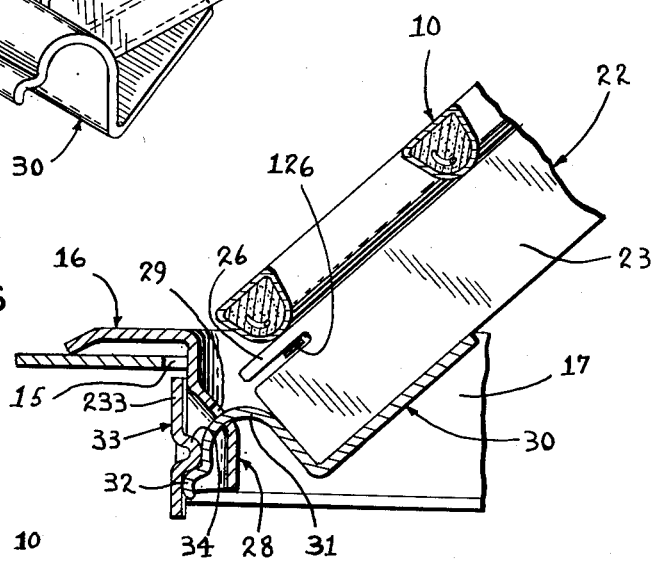
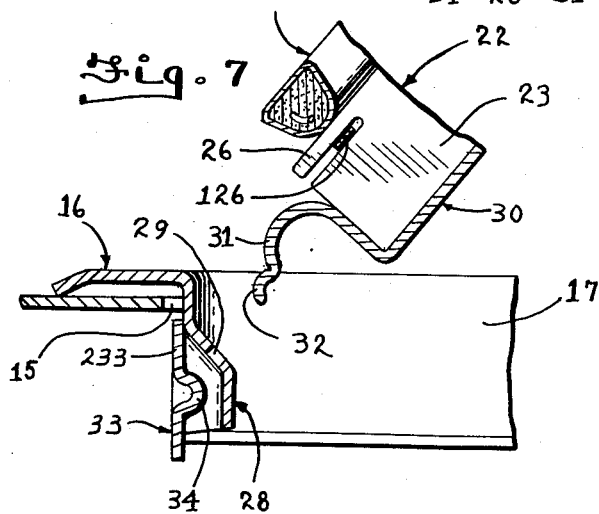
INVENTOR.
FRITZ R. L. ZENTGRAF
BY
Attorney

United States Patent Office 3,047,706
Patented July 31, 1962

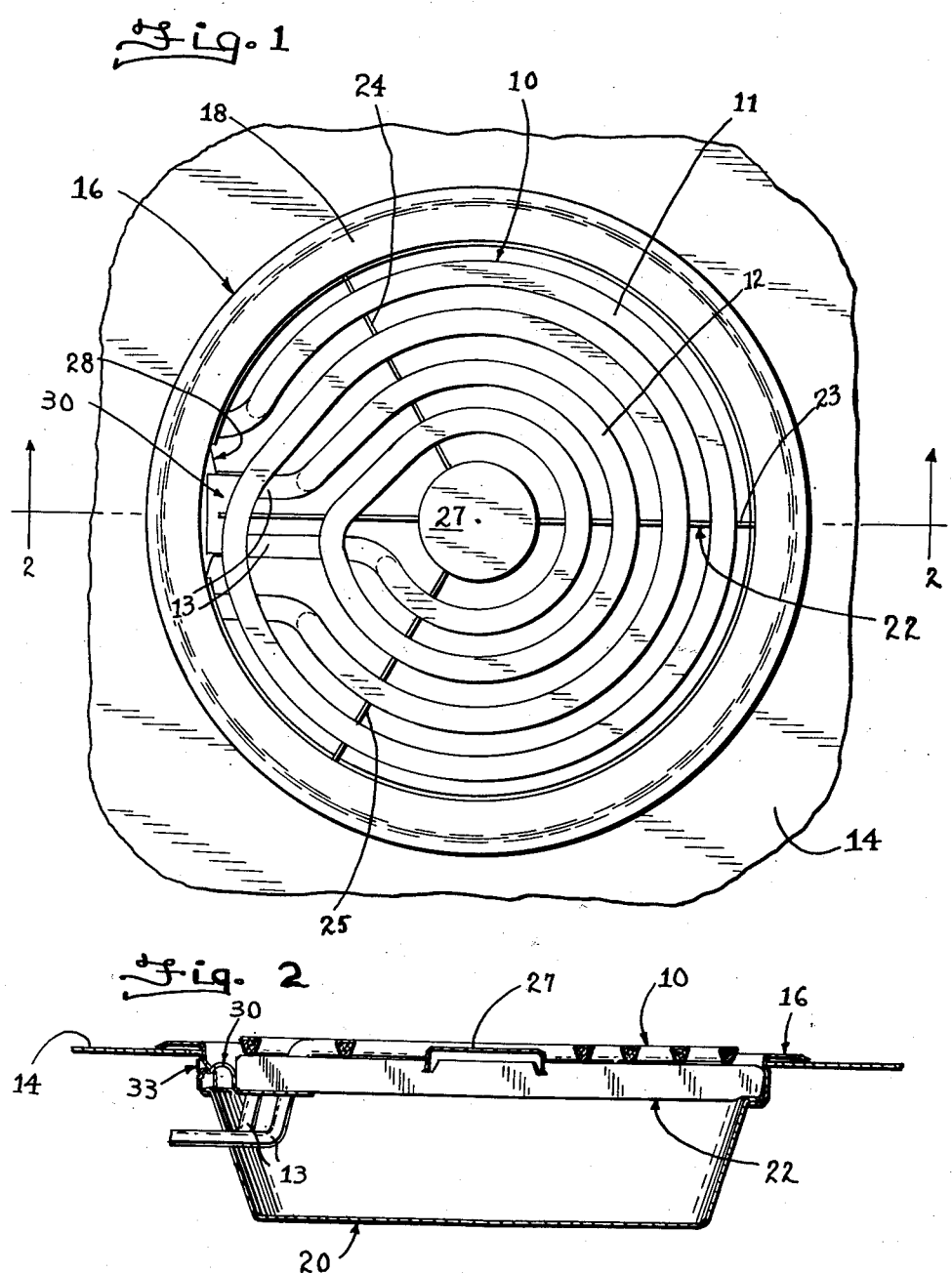
July 31, 1962   F. R. L. ZENTGRAF   3,047,706
ELECTRIC HEATER ASSEMBLIES
Filed May 19, 1959   3 Sheets-Sheet 1
INVENTOR.
FRITZ R. L. ZENTGRAF
Attorney

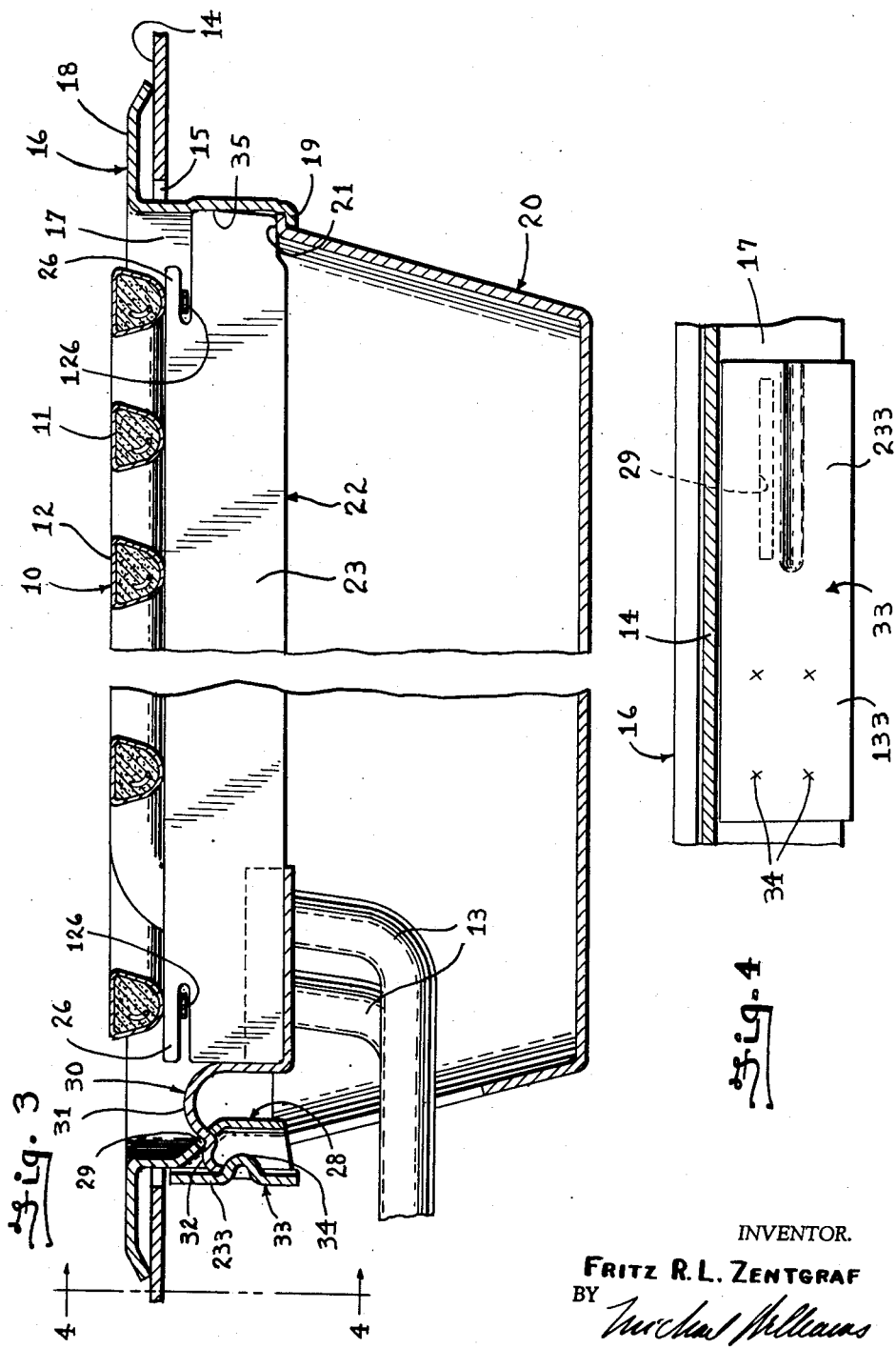

3,047,706
ELECTRIC HEATER ASSEMBLIES
Fritz R. L. Zentgraf, Thistletown, Ontario, Canada, assignor to Edwin L. Wiegand Company, Pittsburgh, Pa., a corporation of Pennsylvania
Filed May 19, 1959, Ser. No. 814,335
12 Claims. (Cl. 219—37)

The present invention relates to electric heater assemblies, more particularly to assemblies of the type adapted to be used as surface heating units in ranges and the like, and the principal object of the invention is to provide new and improved assemblies of the character described.

Present day electric range surface heating unit assemblies usually comprise an electric heating element providing a heat-generating surface for underlying and supporting a vessel to be heated. Such an element is normally supported by the range top within an aperture, and a shallow pan usually underlies the element to catch boiled-over or spilled material.

To provide for ready removal of the above mentioned pan so that it may be washed, it is necessary that the element be shiftable from its normal heating position to a non-heating position. While not essential, it is very desirable that the element be self-sustaining in its non-heating position so that the pan aforesaid may be removed and replaced without necessitating the use of one hand to hold the element in its non-heating position.

While many prior art constructions have been devised to provide the above mentioned desirable features, such constructions have invariably been deficient in one or more important respects. The present invention, in contrast, provides a heating unit assembly which is simple and low in cost yet which provides highly desirable features usually associated with much more complex and expensive constructions. These and other advantages will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a top plan view of a preferred embodiment of a heating unit assembly shown supported in the top of a range and the like.

FIGURE 2 is a sectional view generally corresponding to the line 2—2 of FIGURE 1, FIGURE 3 is a broken view similar to FIGURE 2 but considerably enlarged to better illustrate the details of construction, FIGURE 4 is a fragmentary sectional view generally corresponding to the line 4—4 of FIGURE 3, FIGURE 5 is a fragmentary perspective view of a detail, FIGURE 6 is a fragmentary view similar to FIGURE 3 but showing certain parts in another position, FIGURE 7 is a view similar to FIGURE 6 but showing the parts in separated relation.

With reference to FIGURES 1, 2 and 3, there is shown a surface type, electric heating unit assembly formed of the usual tubular, sheathed, electric resistance heating element whose intermediate portion is convoluted to provide a generally plane heating surface 10 upon which a vessel to be heated may be disposed. At the present time, the assembly comprises two heating elements 11 and 12 which are cooperable to provide the heating surface. The terminal ends 13 of the elements are disposed beneath the heating surface and project in side-by-side relation beyond a margin thereof and are adapted to be connected to suitable leads (not shown) by means of which electrical energy may be fed thereto.

In the present embodiment, the top 14 of the range is formed with an aperture 15 in which the heating surface 10 of the elements is adapted to be generally concentrically disposed. The means presently provided for supporting the heating elements in the heating position seen in FIGURES 1, 2 and 3 comprises the usual trim ring 16 having a tubular wall portion 17 fitting within the range top aperture 15 and an annular flange portion 18 which overlies and rests upon the range top.

The lower end of tubular wall portion 17 of the trim ring 16 is provided with an inwardly directed, annular flange 19 upon which is seated the usual drip pan 20. Such drip pan carries an outwardly directed annular flange 21 which rests upon flange 19 as shown.

Underlying the convoluted portions of the heating elements which provide the heating surface 10 is the usual spider 22 formed of a plurality of arms 23, 24 and 25 secured together in any suitable manner. Arm 23 extends generally parallel with the terminal ends 13 of the elements while arms 24 and 25 extend transversely of arm 23. Any suitable means may be provided for connecting the element convolutions to the spider; for example, and as seen in FIGURE 3, certain of the spider arms may be slotted longitudinally to provide tongues 26 which pass through loop-members 126 welded to the undersides of certain of the convolutions. The usual medallion 27 may be supported by the spider in any suitable manner centrally of the element convolutions.

With drip pan 20 resting upon annular flange 19 of the trim ring, spider 22 rests upon and is supported by the annular flange 21 of the drip pan to thus support the heating surface of the element in the normal horizontal heating position seen in FIGURES 1, 2 and 3.

Means are provided for pivotally connecting the heating elements to the trim ring and in the present embodiment, the following construction is employed. As best seen in FIGURES 1 and 3, a portion of tubular wall 17 of the trim ring is deformed radially inwardly at 28 and such inwardly deformed portion is provided with a horizontal slot 29 whose lower marginal edge provides a pintle for a purpose to be seen. The left-hand end of spider leg 23 terminates short of the tubular wall 17 of the trim ring and welded or otherwise secured to such end to project longitudinally thereof is a sheet metal tongue 30. Tongue 30 has an arcuate portion 31 for extension through the trim ring aperture 29, it being understood that the width of tongue portion 31 is but slightly less than the length of slot 29 so that it substantially spans the latter. For a purpose to be disclosed and in the position of parts seen in FIGURE 3, the free end of tongue 30 is disposed exteriorly of tubular wall 17 of the trim ring and is bent transversely to provide an abutment 32.

With the construction thus far described and referring particularly to FIGURE 3, arcuate portion 31 of the tongue 30 cooperates with the lower defining margin of the slot 29 of the trim ring to provide a hinge about which the element-spider assembly is shiftable from the normal heating position shown to a non-heating position. By merely elevating the right-hand side of the element-spider assembly, the latter will swing about the aforesaid hinge to permit removal of the drip pan for cleaning purposes.

In the event it is desired to remove the trim ring from the range to better clean both the trim ring and also the range top portion which normally underlies the trim ring flange portion 18, the tongue may readily be withdrawn from the slot 29 (see FIGURE 7) to disconnect the element-spider assembly from the trim ring. This assembly may then be dropped through the center of the trim ring to rest upon a range portion (not shown) which underlies its top surface 14. The trim ring may then be removed from the range for the cleaning purposes aforesaid.

It is an important feature of the present invention that the drip pan may be removed and replaced from its normal position supported by the trim ring without requiring that the element-spider assembly be supported by one hand during such removal and replacement. Accordingly, means are provided for selectively maintaining the element-spider assembly in a non-heating position wherein the drip pan is readily accessible.

The means presently provided for the purpose aforesaid is shown in FIGURES 3 and 4 to comprise an elongated strip 33 of spring-like material carried by the trim ring. One end 133 of strip 33 is secured to the exterior of the tubular wall portion 17 of the trim ring by welding or the like at 34 so that its free end 233 overlies slot 29 of the trim ring portion 23 (see FIGURE 4). The free end portion 233 of strip 33 is provided with an elongated, radially inwardly directed embossment which provides an abutment 34 generally co-extensive and parallel with slot 29 and spaced slightly therebelow for a purpose to appear.

With the parts positioned as seen in FIGURE 3, the free end of tongue 30 carried by the left-hand end of spider 23 is engaged with portion 233 of strip 33 and has deflected the latter radially outwardly of the trim ring a slight amount. The resiliency of member 33 therefore urges the spider to the right (in the position of parts shown) and causes the right-hand end of the spider leg 23 to seat in a shallow recess 35 formed in the adjoining portion of the annular wall 17 of the trim ring. This resiliently retains the parts assembled in the normal heating position seen in FIGURE 3 as will be apparent.

When it is desired to pivot the element-spider assembly to a non-heating position to permit removal of the drip pan for cleaning or the like, it is only necessary to raise the right-hand end of such assembly and rotate it in the direction of the arrow about the hinge provided by the tongue 30 and the marginal portion of the trim ring defining the slot 29. The assembly will be rotated about the hinge aforesaid to the position seen in FIGURE 6 wherein abutment 32 of the tongue 30 is engaged beneath abutment 34 of the strip 33. With the abutments thus engaged, the element-spider assembly will be yieldably retained in a non-heating position wherein the drip pan may be readily removed.

To return the element-spider assembly from the position seen in FIGURE 6 to the position seen in FIGURE 3, it is only necessary to press down on the assembly. This will cause abutment 34 to spring radially outwardly and thus allow abutment 32 of the tongue 30 to move therepast and thus permit return of the parts to the position seen in FIGURE 3.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A heater assembly for a range comprising means supported by the range providing a generally vertical wall having a horizontally elongated aperture, an electric heating element having a heat-generating surface normally supported by the range adjacent said wall in a generally horizontal heating position, a sheet metal tongue carried by said element for extension through said wall aperture from one side of said wall to the other and in substantially horizontal spanning relation with said wall aperture, said tongue projecting beyond said other wall side and being cooperable with a defining margin of said wall aperture to provide for pivotal movement of said element from said horizontal heating position to a non-heating position, and abutment means in part carried by the portion of said tongue projecting beyond said other wall side and in part carried by said wall and interengageable to releasably retain said element in said non-heating position.

2. A heater assembly for a range comprising means supported by the range providing a generally vertical wall having a horizontally elongated aperture, an electric heating element having a heat-generating surface normally supported by the range adjacent said wall in a generally horizontal heating position, a sheet metal tongue carried by said element for extension through said wall aperture from one side of said wall to the other and in substantially horizontal spanning relation with said wall aperture, said tongue projecting beyond said other wall side and being cooperable with a defining margin of said wall aperture to provide for pivotal movement of said element from said horizontal heating position to a non-heating position, resilient means disposed on said other wall side adjacent said wall aperture, and abutment means carried by the portion of said tongue projecting beyond said other wall side and interengageable with said resilient means to releasably retain said element in said non-heating position.

3. A heater assembly for a range, comprising a tubular wall supported from a range and having a horizontal opening therethrough, an elongated electric heating element convoluted to provide a generally plane heating surface normally disposed in horizontal heating position within the compass of said tubular wall, connector means connected to and extending underneath said heating element in generally radial fashion beyond the compass of the outermost convolutions, said connector means projecting through said opening and including a pair of adjoining horizontally curved surfaces extending inwardly from the terminal portion of said connector means, the innermost curved surface engaging with the defining margin of said horizontal opening to provide a horizontal pivot about which said heating element may be swung from its horizontal heating position to an upright non-heating position, and resilient means carried by said tubular wall and engageable with the outermost curved surface when said heating element is disposed in its upright position to releasably hold it in such postion.

4. The construction according to claim 3 wherein said connector means is sheet metal.

5. The construction according to claim 3 wherein said resilient means comprises a spring member having an abutment engageable with said outermost curved surface in the upright position of said heating element.

6. The construction according to claim 3 wherein said connector means is sheet metal and extends from one end of a sheet metal arm which is disposed diametrically cross-wise of said tubular wall, said resilient means pressing against said connector means when said heating element is in its horizontal position to press the opposite end of said arm into seating relation with a seat formed in said tubular wall to thereby releasably hold said element in horizontal position.

7. The construction according to claim 3 wherein the height of said curved surfaces is greater than the height of the opening in said tubular wall to prevent separation of said heating element from said tubular wall by straight-line motion of one away from the other.

8. A heater assembly for an apertured stove panel, comprising an adapter ring supported by a panel surface and having a tubular portion extending downwardly into said panel aperture, said tubular portion having a horizontal slot therein, an elongated sheathed electric heating element convoluted to provide a generally plane heating surface normally disposed in horizontal heating position within the compass of said adapter ring, a spider member secured to and underlying said heating element and comprising a sheet metal arm extending diametrically cross-wise of said tubular portion, connector means extending from one end of said arm and projecting through said slot, said connector means being sheet metal and having a pair of horizontally humped sections extending inwardly from its terminal end, the innermost humped section engaging with the defining margin of said slot to provide a horizontal pivot about which said heating element may be swung from its horizontal position to a non-heating upright position, a flat spring secured against the outer wall surface of said tubular portion and having a part pressing against the terminal end of said connector means to press the opposite end of said arm into seating relation with a seat formed in said tubular portion to thereby releasably hold said element in horizontal position, said spring part having a horizontal rib engaging behind the outermost humped section when said heating element has been swung to upright position to releasably hold the element in such position.

9. A heater assembly for a range comprising an apertured, generally vertical wall, an electric heating element having a heat-generating surface normally supported by the range adjacent said wall on one side thereof in a generally horizontal heating position, a leg carried by said element and projecting beyond the periphery of said element heating surface and through the aperture in said wall to the other side thereof, said leg cooperating with a defining margin of said wall aperture to provide a hinge about which said element is shiftable from said horizontal heating position to a non-heating position, and an abutment resiliently supported on said other wall side adjacent said wall aperture for engagement with the free end of said projecting leg, a portion of the free end of said leg being disposed above said abutment when said element is in its horizontal heating position and such portion being disposed beneath said abutment for engagement therewith when said element is in its non-heating position to resiliently retain said element thereat.

10. The construction of claim 9 wherein said abutment is provided by one end of an elongated resilient member whose other end is anchored for support purposes.

11. The construction of claim 10 wherein said resilient member is formed of sheet metal having a rounded protuberance providing said abutment.

12. The construction of claim 11 wherein the free end of said projecting leg is horizontally flattened and wherein said resilient member protuberance extends horizontally for substantial engagement with said flattened leg.

References Cited in the file of this patent
UNITED STATES PATENTS

| | | |
|---|---|---|
| 2,725,456 | Weyrick | Nov. 29, 1955 |
| 2,816,206 | Eckblad | Dec. 10, 1957 |
| 2,877,334 | McOrlly et al. | Mar. 10, 1959 |
| 2,955,189 | Fry | Oct. 4, 1960 |